US012756285B2

(12) United States Patent
Arai et al.

(10) Patent No.: US 12,756,285 B2
(45) Date of Patent: Oct. 6, 2026

(54) SWINGING UNIT

(71) Applicant: NIDEC INSTRUMENTS CORPORATION, Nagano (JP)

(72) Inventors: Tsutomu Arai, Nagano (JP); Takeshi Sue, Nagano (JP); Shinji Minamisawa, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 368 days.

(21) Appl. No.: 18/624,077

(22) Filed: Apr. 1, 2024

(65) Prior Publication Data

US 2024/0333118 A1 Oct. 3, 2024

(30) Foreign Application Priority Data

Apr. 3, 2023 (JP) ................................ 2023-060307

(51) Int. Cl.
*H02K 33/18* (2006.01)
*H04N 23/58* (2023.01)

(52) U.S. Cl.
CPC ............ *H02K 33/18* (2013.01); *H04N 23/58* (2023.01)

(58) Field of Classification Search
CPC ............................... H02K 33/18; H04N 23/58
See application file for complete search history.

(56) References Cited

U.S. PATENT DOCUMENTS 7,719,396 B2 * 5/2010 Umeda .................. H02K 33/16 359/199.1
11,184,511 B2 11/2021 Minamisawa
2008/0169891 A1 * 7/2008 Umeda .................. G02B 7/003 335/229

FOREIGN PATENT DOCUMENTS

JP 2020166179 10/2020

OTHER PUBLICATIONS

Translation of Japanese Pub. No. JP2002169122A (Year: 2008).*

* cited by examiner

*Primary Examiner* — Nicholas G Giles
(74) *Attorney, Agent, or Firm* — JCIPRNET

(57) ABSTRACT

According to an embodiment, a swinging unit is provided with a movable body, a support body which supports the movable body via fulcrum portions in such a state that the movable body is swingably displaceable, and a swing drive portion which swings the movable body. The swing drive portion is constituted by a pair of a coil, which is fixed to a coil fixed portion at one of the movable body and the support body, and a magnet, which is fixed to a magnet fixed portion at the other one of the movable body and the support body. The coil fixed portion is provided with a positioning portion which performs positioning of the coil relative to the coil fixed portion by being in contact with an inner surface of the coil.

10 Claims, 9 Drawing Sheets

SWINGING UNIT

CROSS REFERENCE TO RELATED APPLICATION

The present invention claims priority under 35 U.S.C. § 119 to Japanese Application No. 2023-060307 filed Apr. 3, 2023, the entire content of which is incorporated herein by reference.

BACKGROUND

Field of the Invention

At least an embodiment of the present invention relates to a swinging unit.

Description of the Related Documents

As an example of this type of swinging unit, a device described in Japanese Unexamined Patent Publication No. 2020-166179 is available. Japanese Unexamined Patent Publication No. 2020-166179 describes an optical unit in which a movable body provided with an optical module is swingably supported on a fixed body. A swing drive portion which swings the movable body is constituted by a pair of a coil, which is fixed to the fixed body, and a magnet, which is fixed to the movable body.

The coil and the magnet which constitute the swing drive portion are assembled with a predetermined magnetic gap therebetween. However, conventionally, positioning of the coil with respect to the fixed body has been performed by using an outer diameter of a substrate on which the coil is mounted or an outer peripheral surface of the coil. That is, the coil is assembled onto the fixed body by the positioning described above. However, the mounting of the coil onto the substrate tends to produce variations. In addition, as for the outer peripheral surface of the coil, the outer diameter is likely to be varied according to the number of turns.

Accordingly, in other words, due to the above-mentioned variations, the assembly must be conducted while ensuring a magnetic gap between the coil and the magnet to be large more than necessary. Consequently, there arises a problem in which a torque produced in the magnetic gap is reduced, and the thrust force for driving the movable body is decreased and further becomes unstable.

An embodiment of the present invention provides a swinging unit in which the accuracy of the assembling position of the coil is enhanced, whereby the magnetic gap is set appropriately with ease, and as a consequence, the thrust force for driving the movable body can be increased and further stabilized.

SUMMARY

A swinging unit according to at least an embodiment of the present invention is provided with: a movable body; a support body which supports the movable body via a fulcrum portion in such a state that the movable body is swingably displaceable; and a swing drive portion which swings the movable body, and is characterized in that: the swing drive portion is constituted by a pair of a coil, which is fixed to a coil fixed portion at one of the movable body and the support body, and a magnet, which is fixed to a magnet fixed portion at the other one of the movable body and the support body; and the coil fixed portion is provided with a positioning portion which performs positioning of the coil relative to the coil fixed portion by being in contact with an inner surface of the coil.

In at least an embodiment of the present invention, the swing drive portion is constituted by a pair of the coil, which is fixed to the coil fixed portion at one of the movable body and the support body, and the magnet, which is fixed to the magnet fixed portion at the other one of the movable body and the support body. Further, the coil fixed portion is provided with the positioning portion which performs positioning of the coil relative to the coil fixed portion by being in contact with the inner surface of the coil.

Since the coil is formed by winding a wire rod around a jig, the inner surface of the completed coil positionally conforms to an outer peripheral surface of the jig, and thus, variations are less likely to occur in the inner surface as compared to the outer surface of the coil.

By virtue of this feature, in other words, since the inner surface of the coil is used for the positioning, the accuracy of the assembling position of the coil is more enhanced than by a conventional technique, and it becomes easier to appropriately set the magnetic gap, and as a consequence, the thrust force for driving the movable body can be increased and further stabilized.

Also, at least an embodiment of the present invention is characterized in that in the swinging unit, the coil is mounted on a substrate; the substrate is attached to one opening portion of the support body, so that the coil is positioned relative to the coil fixed portion of the support body by the positioning portion; the magnet is fixed to the movable body; and the movable body is attached to the other opening portion of the support body, so that the magnet enters an area formed by inner surfaces of the coil and is fixed in such a state that a predetermined magnetic gap is provided between the magnet and the inner surfaces.

In at least an embodiment of the present invention, the coil is mounted on the substrate, and the substrate is attached to one opening portion of the support body, so that the coil is positioned relative to the coil fixed portion of the support body by the positioning portion. As a result, the coil mounted on the substrate can be assembled onto the support body with a higher positional accuracy and more easily than by a conventional technique.

Further, the magnet is fixed to the movable body, and the movable body is attached to the other opening portion of the support body, so that the magnet enters the area formed by the inner surfaces of the coil, and is fixed in such a state that the predetermined magnetic gap is provided between the magnet and the inner surfaces. As a result, by attaching the movable body to the support body, the swinging unit in which the magnetic gap is set with high accuracy can be easily assembled.

Also, at least an embodiment of the present invention is characterized in that in the swinging unit, the movable body is supported on the support body to be swingable about a first axis; the movable body is provided with an optical module; the optical module is supported on the movable body to be swingable about a second axis intersecting the first axis; and the swing drive portion is constituted of a first swing drive portion, which causes the movable body to be swung about the first axis, and a second swing drive portion, which causes the optical module to be swung about the second axis.

In at least an embodiment of the present invention, the swing drive portion is constituted of the first swing drive portion, which causes the movable body provided with the optical module to be swung about the first axis, and the second swing drive portion, which causes the optical module to be swung about the second axis intersecting the first axis. As a result, by performing control to combine both of the driving of the first swing drive portion and the second swing drive portion, it is possible to cause the optical axis of the optical module to be directed in all directions with high accuracy on the front side of the optical module or oscillation to be performed.

Also, at least an embodiment of the present invention is characterized in that in the swinging unit, the first swing drive portion is constituted by a pair of a first coil and a first magnet; the second swing drive portion is constituted by a pair of a second coil and a second magnet; and the substrate includes a displacement allowing portion, which allows the first coil and the second coil in a state of being mounted to be displaced in directions of coming close to and separating from each other, between a first part on which the first coil is mounted and a second part on which the second coil is mounted.

In at least an embodiment of the present invention, the substrate includes the displacement allowing portion which allows the first coil and the second coil in the state of being mounted to be displaced in the directions of coming close to and separating from each other. In other words, the positions of the first coil and the second coil which are mounted on the substrate can be displaced in the directions of coming close to and separating from each other. As a result, positioning to be performed by bringing the first coil into contact with the positioning portion and positioning to be performed by bringing the second coil into contact with the positioning portion can be carried out without substantially receiving interference from each other.

Also, at least an embodiment of the present invention is characterized in that in the swinging unit, the positioning portion is a protruding part provided on the support body; and the protruding part includes a positioning surface which comes into contact with the inner surface of the coil.

In at least an embodiment of the present invention, since the positioning portion includes the positioning surface which comes into contact with the inner surface of the coil, the positioning of the coil relative to the coil fixed portion can be performed with a simple structure.

Also, at least an embodiment of the present invention is characterized in that in the swinging unit, the coil includes four inner surfaces; and the protruding part and the positioning surface are provided to correspond to each of the four inner surfaces.

In at least an embodiment of the present invention, since the protruding part and the positioning surface are provided to correspond to each of the four inner surfaces of the coil, it is possible to perform the positioning of the coil relative to the coil fixed portion with high accuracy.

Also, at least an embodiment of the present invention is characterized in that in the swinging unit, the coil is a stepped coil including a first inner surface and a second inner surface which is located closer to an outer surface of the coil than the first inner surface; and the positioning is performed by the second inner surface being in contact with the positioning surface of the protruding part.

In at least an embodiment of the present invention, the coil is the stepped coil, and the positioning is performed by the second inner surface of the stepped coil being in contact with the positioning surface. As a result, a surface on the opposite side of the positioning surface of the protruding part, in other words, the position of a surface facing the magnet, can be separated from the magnet. Therefore, the magnetic gap can be made smaller than that of a case where the stepped coil is not used.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

Embodiments of a swinging unit according to the present invention will be described in detail below with reference to the accompanying drawings.

In the following description, three axes orthogonal to each other are referred to as an X-axis, a Y-axis, and a Z-axis, as indicated in each of the drawings. A direction indicated by an arrow of the three axes (X, Y, Z) represents a positive (+) direction of each of the directions, and a direction opposite to the direction of the arrow represents a negative (−) direction. In the present specification, the X-axis direction corresponds to a direction of a first axis, and the Y-axis direction corresponds to a direction of a second axis.

Embodiment 1

Embodiment 1 of the present invention will be described with reference to FIGS. 1 to 9A and 9B.

Figure 1:
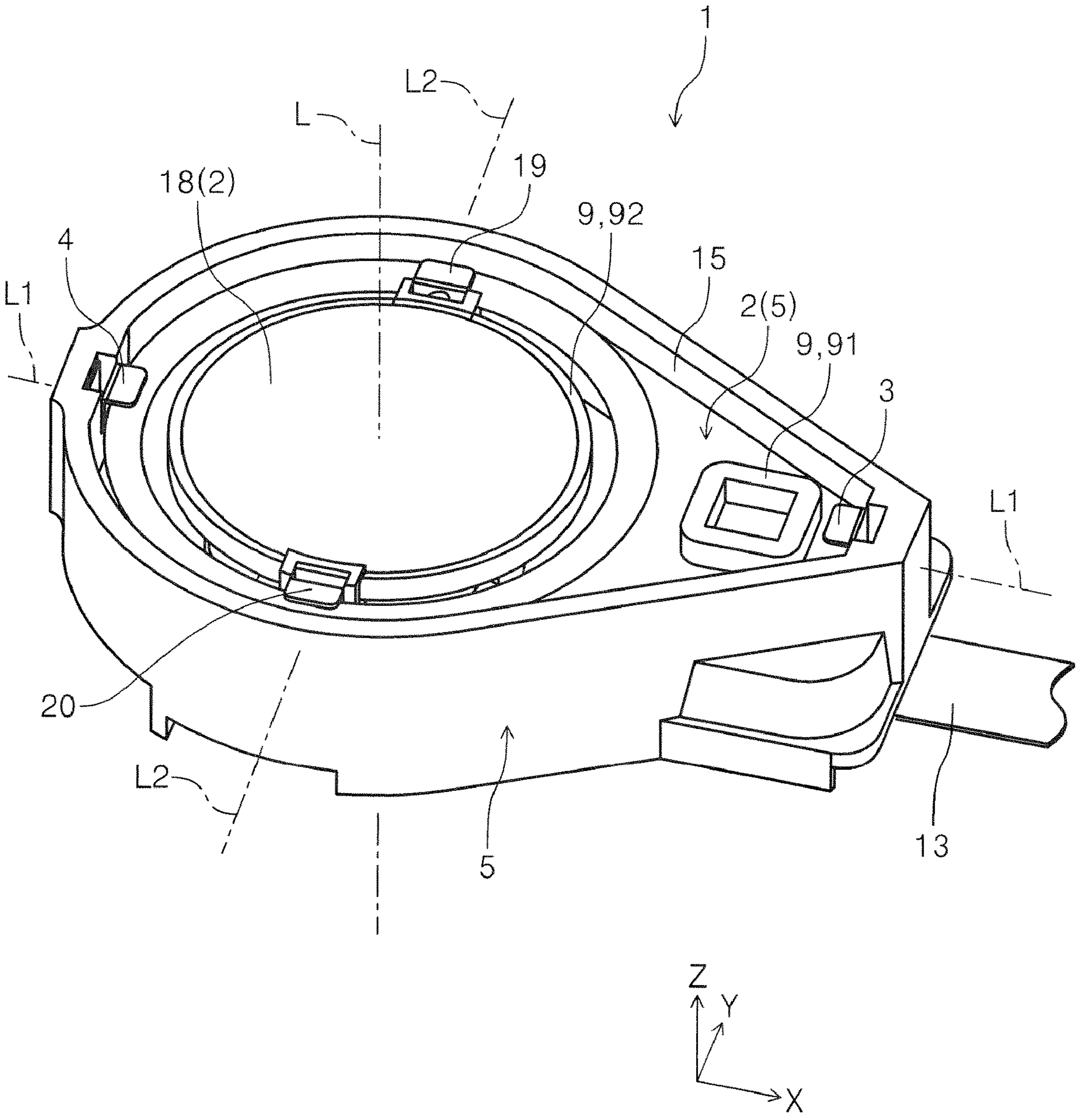
FIG. 1 is a perspective view of an outer appearance of a swinging unit according to Embodiment 1 as seen from above.
Figure 8:
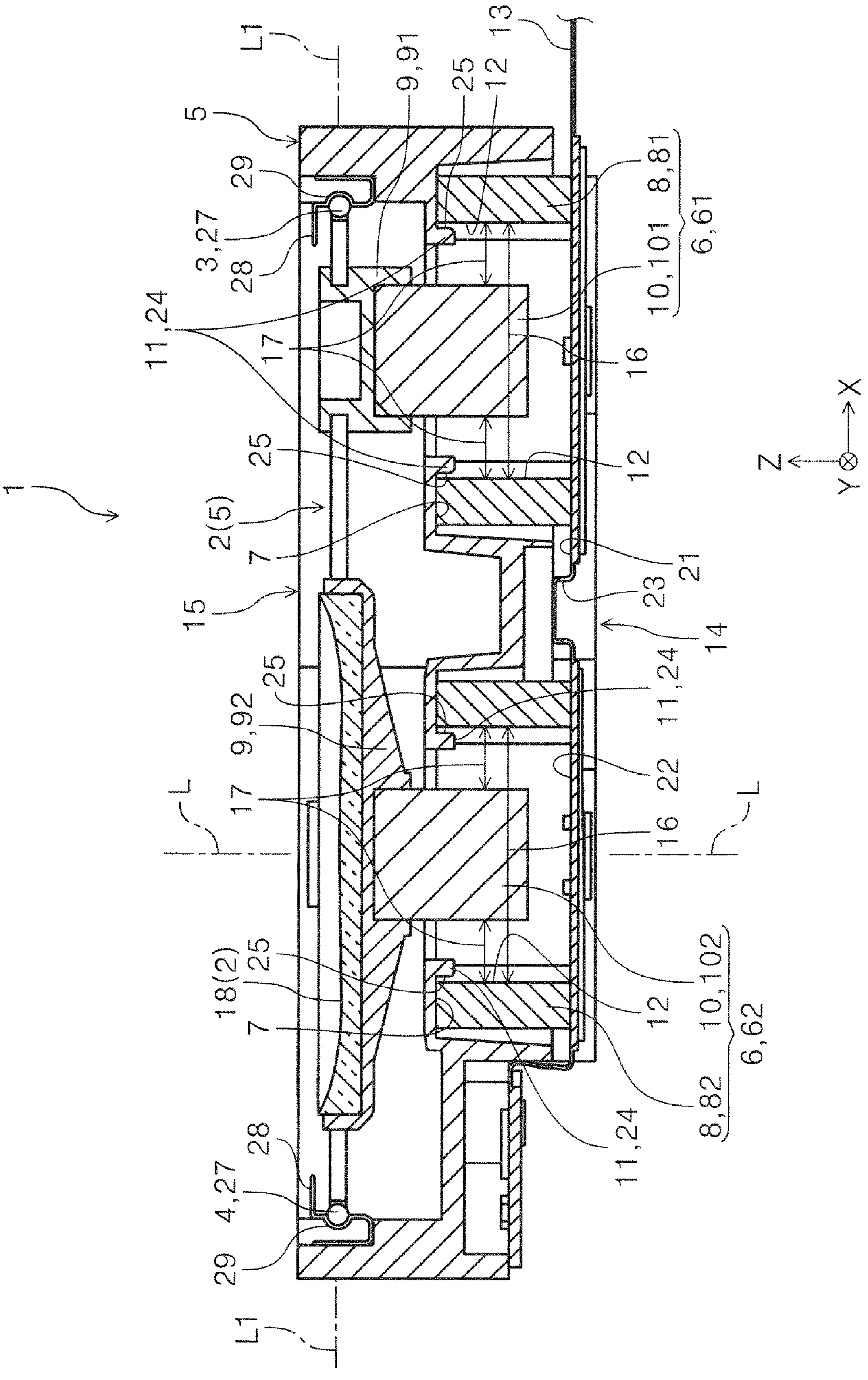
FIG. 8 is a diagram showing the essential part of the swinging unit according to Embodiment 1 in cross section.

As illustrated in FIGS. 1 and 8, a swinging unit 1 of the present embodiment is provided with a movable body 2, a support body 5 which supports the movable body 2 via a pair of fulcrum portions 3 and 4 in such a state that the movable body 2 is swingably displaceable, and a swing drive portion 6 which swings the movable body 2.

The swing drive portion 6 is constituted by arranging a coil 8 and a magnet 10 with a predetermined magnetic gap 17 therebetween. The coil 8 is fixed to a coil fixed portion 7 of the support body 5. The magnet 10 is fixed to a magnet fixed portion 9 of the movable body 2. The coil fixed portion 7 is provided with a positioning portion 11 for positioning the coil 8 relative to the support body 5. The positioning portion 11 is configured such that the positioning of the coil 8 relative to the coil fixed portion 7 is achieved by the positioning portion 11 being in contact with an inner surface 12 of the coil 8.

Figure 4:
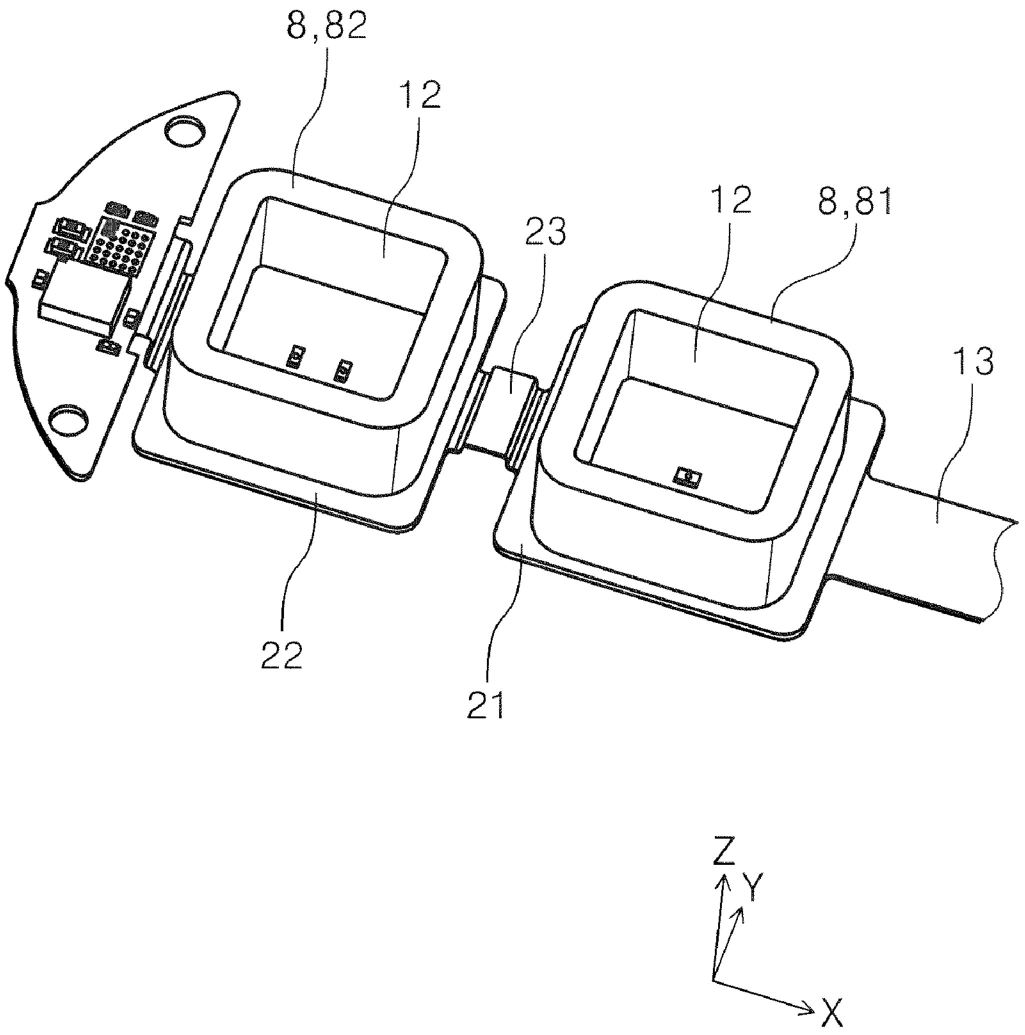
FIG. 4 is a perspective view of a substrate on which coils according to Embodiment 1 are mounted.

As illustrated in FIGS. 4 and 8, the coil 8 is mounted on a long substrate 13. In the present embodiment, as the coil 8, two coils, i.e., a first coil 81 and a second coil 82, are mounted on the substrate 13. Note that for the swinging unit 1 of at least an embodiment of the present invention, the number of coils 8 to be used may be one.

The positioning of the coils 8, in other words, the coils 81 and 82, relative to the coil fixed portion 7 of the support body 5 is achieved by means of the positioning portion 11 as described above, by making the substrate 13 attached to an opening portion 14, which is one opening portion of the support body 5. The magnet 10 is fixed to the movable body 2 as described above. As the movable body 2 is attached to an opening portion 15, which is the other opening portion of the support body 5, the magnet 10 enters an area 16 formed by the inner surfaces 12 of the coil 8 and is fixed in such a state that a predetermined magnetic gap 17 is provided between the magnet 10 and the inner surfaces 12.

Figure 7:
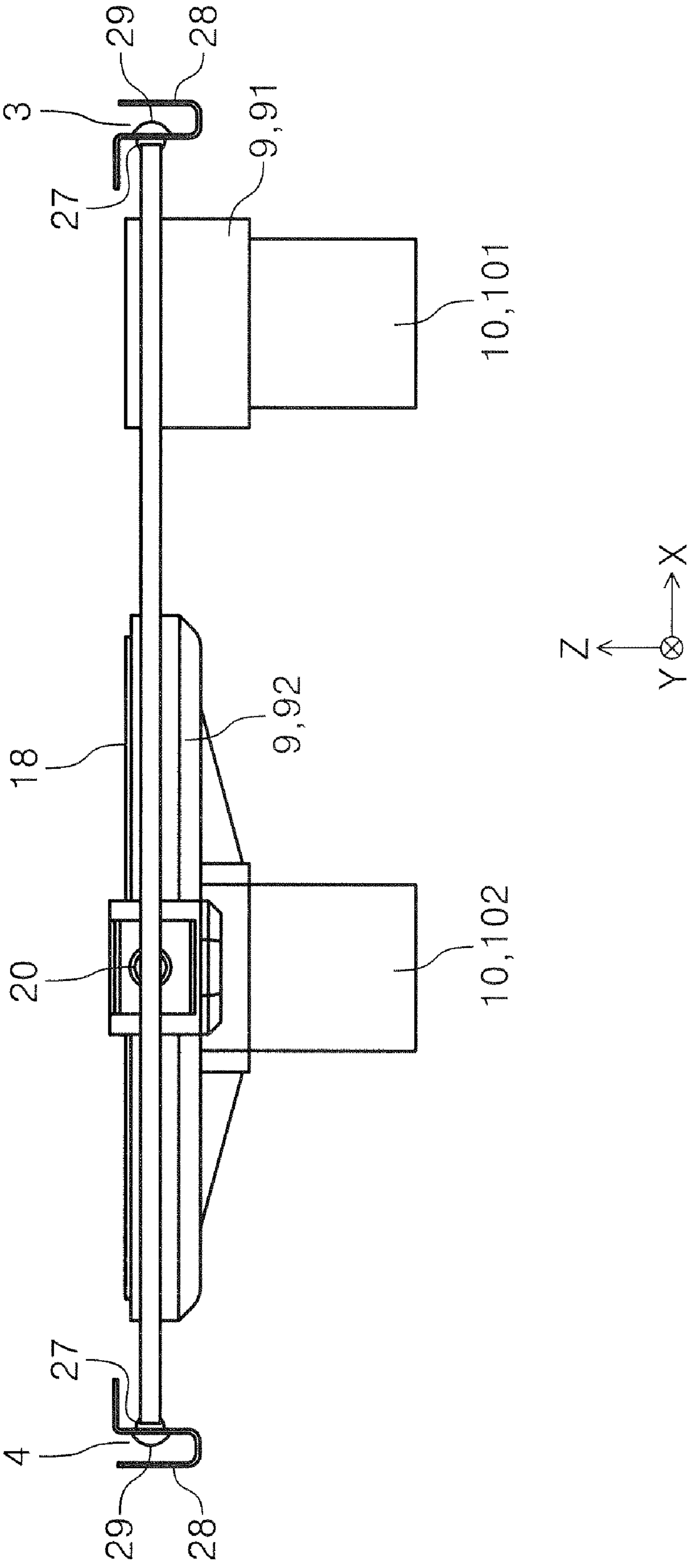
FIG. 7 is a side view of a movable body according to Embodiment 1.

As illustrated in FIG. 1, the movable body 2 is supported on the support body 5 to be swingable about a first axis L1 by means of the fulcrum portions 3 and 4. As illustrated in FIGS. 7 and 8, in the present embodiment, the fulcrum portions 3 and 4 allow the swinging about the first axis L1 to be performed by bringing a spherical body 27, which is attached to the movable body 2, into contact with a concave portion 29 of a spring member 28 fixed to the support body 5, elastically.

In the present embodiment, the movable body 2 is provided with an optical module 18.

In the following, the optical module 18 is a concave mirror. In FIGS. 1 and 8, reference symbol L indicates an optical axis of the optical module 18.

The swinging unit 1 is used for the purpose of swinging the movable body 2, more specifically, the optical module 18, such that an emitted light beam or an image is reflected in a desired direction by the concave mirror. A specific example of the above use includes an actuator for augmented reality (AR) glass or the like, which performs control such that the optical module 18, which is the concave mirror, swings in a reciprocating manner at high speed, that is, oscillation is performed. Alternatively, by forming the optical module 18 as a thin camera, the optical module 18 may be used as an actuator which performs attitude control of a thin camera of a camera-equipped portable telephone, etc.

The optical module 18 is supported on the movable body 2 to be swingable about a second axis L2 intersecting the first axis L1 by means of fulcrum portions 19 and 20.

That is, the optical module 18 is swingably supported on the movable body 2, with the movable body 2 serving as the support body 5. In other words, the optical module 18 itself functions as the movable body 2, and is supported on the movable body 2, which serves as the support body 5, to be swingable about the second axis L2. Since the structure of the fulcrum portions 19 and 20 is the same as that of the fulcrum portions 3 and 4, description thereof will be omitted.

As illustrated in FIG. 8, the swing drive portion 6 is constituted of two swing drive portions, i.e., a first swing drive portion 61, which causes the movable body 2 to be swung about the first axis L1, and a second swing drive portion 62, which causes the optical module 18 to be swung about the second axis L2.

Note that for the swinging unit 1 of at least an embodiment of the present invention, a structure including only one of the first swing drive portion 61 and the second swing drive portion 62 may be employed.

The first swing drive portion 61 is constituted by a pair of the first coil 81 and a first magnet 101. The second swing drive portion 62 is constituted by a pair of the second coil 82 and a second magnet 102. In the present embodiment, the magnet 10 is constituted by two magnets, i.e., the first magnet 101 and the second magnet 102. The first magnet 101 is fixed to a first magnet fixed portion 91 serving as the magnet fixed portion 9. The second magnet 102 is fixed to a second magnet fixed portion 92 serving as the magnet fixed portion 9.

In the present embodiment, as illustrated in FIGS. 7 and 8, the second magnet fixed portion 92 also serves as a fixed portion to which the optical module 18 is fixed.

In the present embodiment, as illustrated in FIGS. 4 and 8, the substrate 13 is provided with a displacement allowing portion 23, which allows the first coil 81 and the second coil 82 in a state of being mounted to be displaced in directions of coming close to and separating from each other, between a first part 21 on which the first coil 81 is mounted and a second part 22 on which the second coil 82 is mounted.

Positioning Portion

As illustrated in FIGS. 5, 6, 8 and 9, the positioning portion 11 is constituted by a protruding part 24 provided on the support body 5. The protruding part 24 includes a positioning surface 25 which comes into contact with the inner surface 12 of each of the coils 81 and 82. While FIG. 8 illustrates as if there is a gap between the positioning surface 25 of the protruding part 24 and each of the inner surfaces 12 of the coils 81 and 82, the gap is illustrated in order to avoid the drawing becoming confusing. That is, as illustrated in FIG. 9A, the positioning surface 25 and the inner surface 12 are formed to be substantially in contact with each other so that the effect of the positioning as described above can be obtained.

Figure 5:
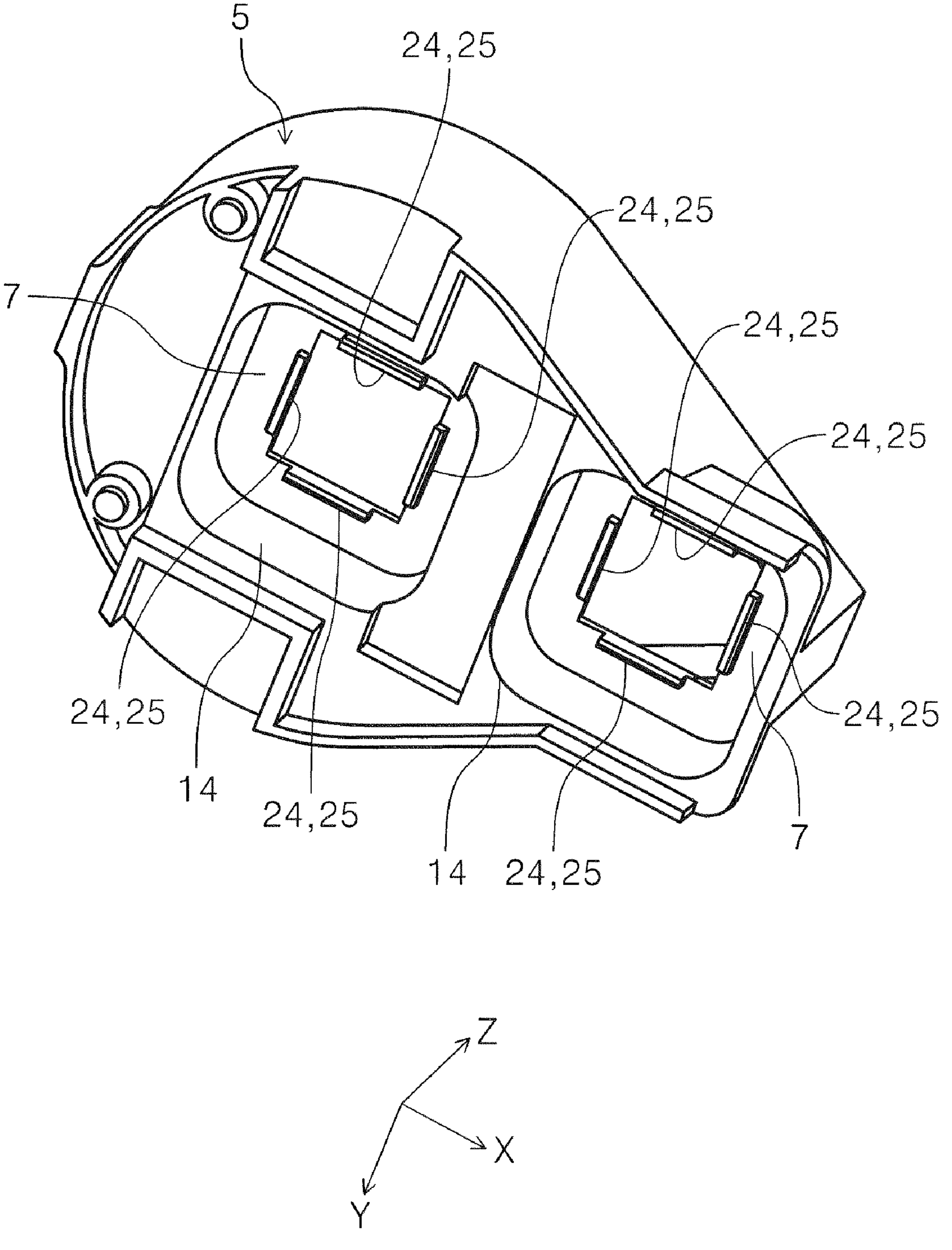
FIG. 5 is a perspective view of a support body according to Embodiment 1 as seen from below.
Figure 6:
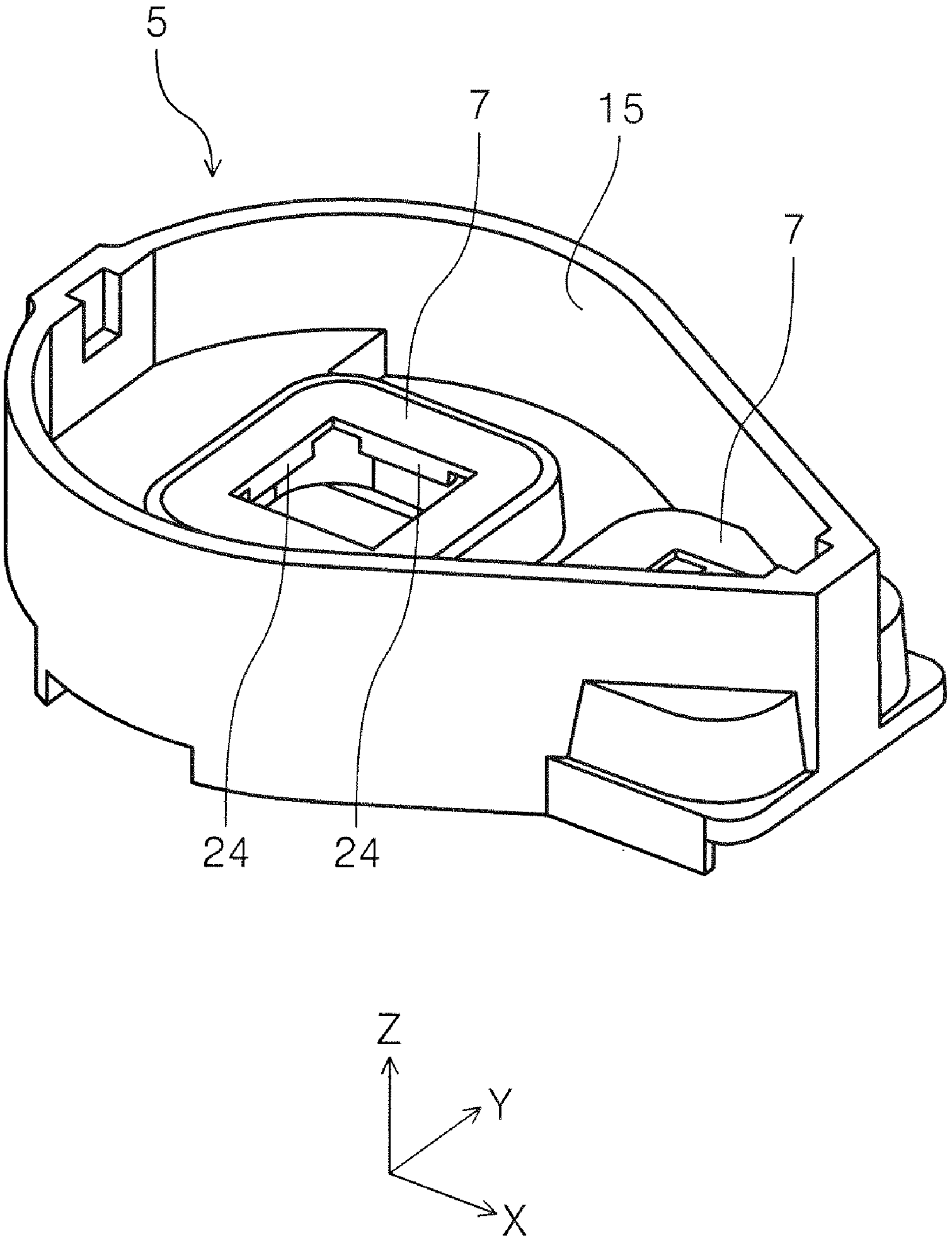
FIG. 6 is a perspective view of the support body according to Embodiment 1 as seen from above.

As illustrated in FIGS. 5 and 6, the support body 5 is formed by integral molding using a resin material such that the support body 5 includes the opening portion 14, the opening portion 15, the coil fixed portion 7, and the protruding part 24.

Also, in the present embodiment, as illustrated in FIG. 4, the coils 81 and 82 are each formed in a square shape, as seen in plan view, having four inner surfaces 12. Further, as illustrated in FIG. 5, the protruding part 24 and the positioning surface 25 are provided to correspond to each of the four inner surfaces 12, 12, 12, and 12.

Description of Assembly and Alignment of Coils

Figure 2:
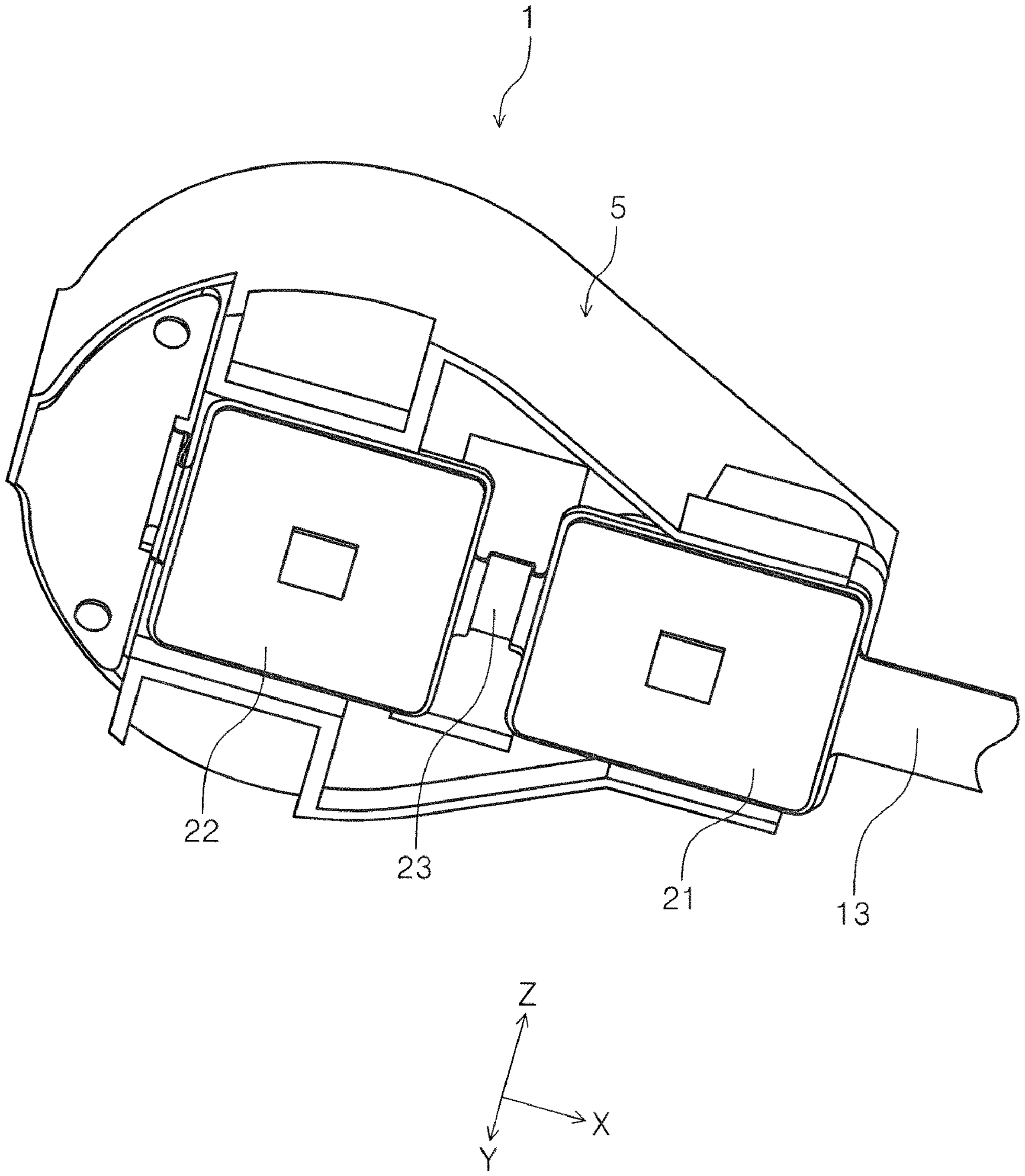
FIG. 2 is a perspective view of an outer appearance of the swinging unit according to Embodiment 1 as seen from below.

The substrate 13 (FIG. 4) on which the coils 81 and 82 are mounted is attached to the one opening portion 14 side (FIG. 5) of the support body 5 to bring about the state illustrated in FIG. 2. In doing so, the assembly is conducted such that the respective inner surfaces 12 (FIG. 4) of the coils 81 and 82 are brought into contact with the positioning surfaces 25 (FIG. 9A) of the protruding parts 24 (FIG. 5) which constitute the positioning portions 11. As a result, the coils 81 and 82 can be assembled in such a state that the positioning of the coils 81 and 82 relative to the coil fixed portion 7 of the support body 5 is achieved.

Figure 3:
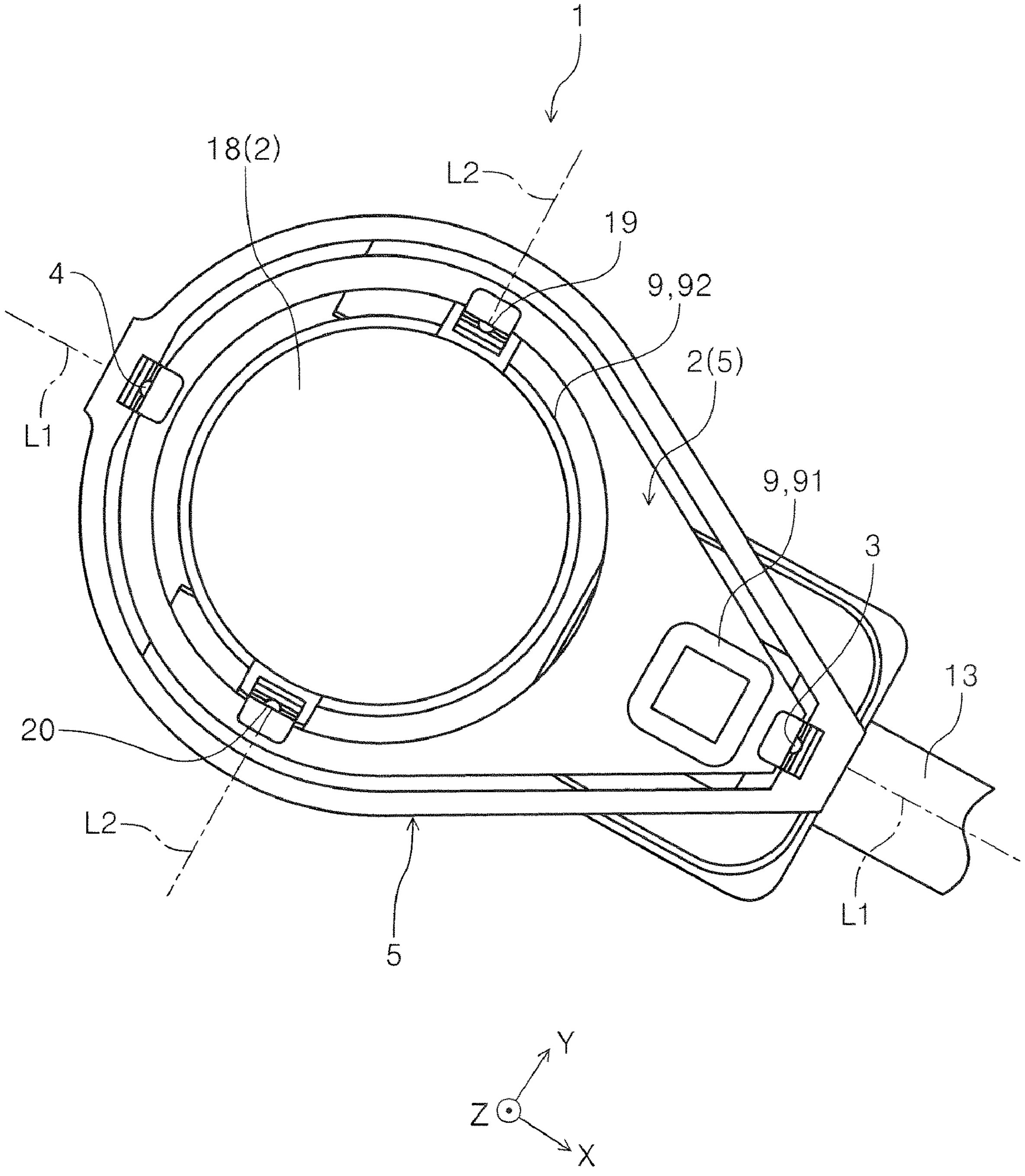
FIG. 3 is a plan view of the swinging unit according to Embodiment 1.

In addition, the movable body 2 (FIG. 7) to which the magnets 101 and 102 are fixed is attached to the other opening portion 15 side (FIG. 6) of the support body 5 to bring about the state illustrated in FIGS. 1 and 3. The movable body 2 is designed such that as the movable body 2 is attached to the opening portion 15 side of the support body as described above, the magnets 101 and 102 enter the area 16 formed by the inner surfaces 12 of each of the coils 81 and 82 and are fixed in such a state that the predetermined magnetic gap 17 is provided between the magnets 101 and 102 and the inner surfaces 12.

Description of Advantageous Effects of Embodiment 1

(1) In the present embodiment, the swing drive portion 6 (61, 62) is constituted by a pair of the coil 8 (81, 82) fixed to the coil fixed portion 7 of the support body 5 and the magnet 10 (101, 102) fixed to the magnet fixed portion 9 (91, 92) of the movable body 2. Further, the coil fixed portion 7 is provided with the positioning portion 11 which performs positioning of the coil 8 (81, 82) relative to the coil fixed portion 7 by being in contact with the inner surface 12 of the coil 8 (81, 82).

As described above, since the coil 8 (81, 82) is formed by winding a wire rod around a jig (not shown), the inner surface 12 of the completed coil 8 (81, 82) positionally conforms to an outer peripheral surface of the jig. That is, dimensional variations are less likely to occur in the inner surface 12 of the coil 8 (81, 82) as compared to the outer surface of the coil 8 (81, 82). In the present embodiment, since the inner surface 12 of the coil 8 (81, 82) is used for the positioning, the accuracy of the assembling position of the coil 8 (81, 82) is more enhanced than by a conventional technique, and it becomes easier to appropriately set the magnetic gap. Consequently, it is possible to increase and further stabilize the thrust force for driving the movable body 2.

(2) Also, in the present embodiment, the coil 8 (81, 82) is mounted on the substrate 13.

Further, as the substrate 13 is attached to the one opening portion 14 of the support body 5, the positioning of the coil 8 (81, 82) relative to the coil fixed portion 7 of the support body 5 is achieved by means of the positioning portion 11. As a result, the coil 8 (81, 82) mounted on the substrate 13 can be assembled onto the support body 5 with a higher positional accuracy and more easily than by a conventional technique.

In addition, the magnet 10 (101, 102) is fixed to the movable body 2. Further, as the movable body 2 is attached to the other opening portion 15 of the support body 5, the magnet 10 (101, 102) enters the area 16 formed by the inner surfaces 12 of the coil 8 (81, 82), and is fixed in such a state that the predetermined magnetic gap 17 is provided between the magnet 10 (101, 102) and the inner surfaces 12. As a result, by attaching the movable body 2 to the support body 5, the swinging unit 1 in which the magnetic gap 17 is set with high accuracy can be easily assembled.

(3) Also, in the present embodiment, the swing drive portion 6 is constituted of the first swing drive portion 61, which causes the movable body 2 provided with the optical module 18 to be swung about the first axis L1, and the second swing drive portion 62, which causes the optical module 18 to be swung about the second axis L2 intersecting the first axis L1.

As a result, by performing control to combine both of the driving of the first swing drive portion 61 and the second swing drive portion 62, it is possible to cause the optical axis of the optical module to be directed in all directions with high accuracy on the front side of the optical module or oscillation to be performed.

(4) Also, in the present embodiment, the substrate 13 includes the displacement allowing portion 23 which allows the first coil 81 and the second coil 82 in a state of being mounted to be displaced in directions of coming close to and separating from each other.

That is, the positions of the first coil 81 and the second coil 82 which are mounted on the substrate 13 can be displaced in the directions of coming close to and separating from each other. As a result, positioning to be performed by bringing the first coil 81 into contact with the positioning portion 11 and positioning to be performed by bringing the second coil 82 into contact with the positioning portion 11 can be carried out without substantially receiving interference from each other.

(5) Also, in the present embodiment, since the positioning portion 11 includes the positioning surface 25 which comes into contact with the inner surface 12 of the coil 8 (81, 82), the positioning of the coil 8 (81, 82) relative to the coil fixed portion 7 can be performed with a simple structure.

(6) Also, in the present embodiment, since the protruding part 24 and the positioning surface 25 are provided to correspond to each of the four inner surfaces 12, 12, 12, and 12 of the coil 8 (81, 82), it is possible to perform the positioning of the coil 8 (81, 82) relative to the coil fixed portion 7 with high accuracy.

Embodiment 2

Next, a swinging unit 1 according to Embodiment 2 will be described with reference to FIG. 9B. The same reference numerals will be assigned to parts that are the same as those of Embodiment 1, and description of the structure of the same parts and the corresponding effects and advantages will be omitted.

In the present embodiment, a coil 8 is a stepped coil 80 including a first inner surface 121 and a second inner surface 122 which is located closer to an outer surface 26 of the coil 8 than the first inner surface 121. Further, the second inner surface 122 is configured such that the positioning is performed by the second inner surface 122 being in contact with a positioning surface 25 of a protruding part 24.

Figure 9A:
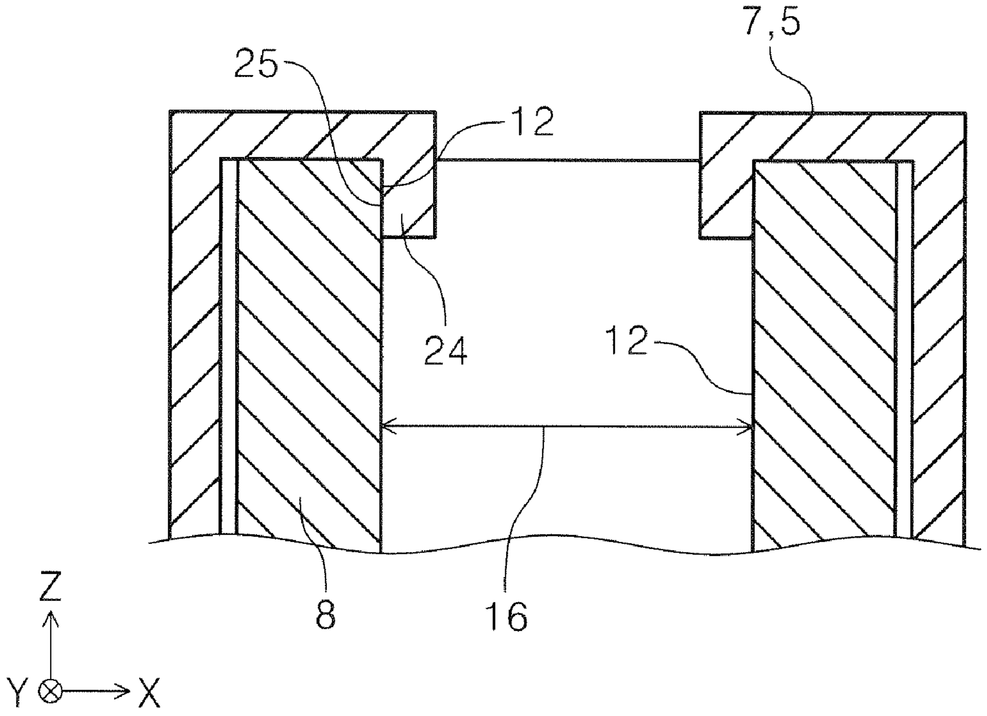
FIGS. 9A and 9B are diagrams showing a coil and a positioning portion according to Embodiment 1.
Figure 9B:
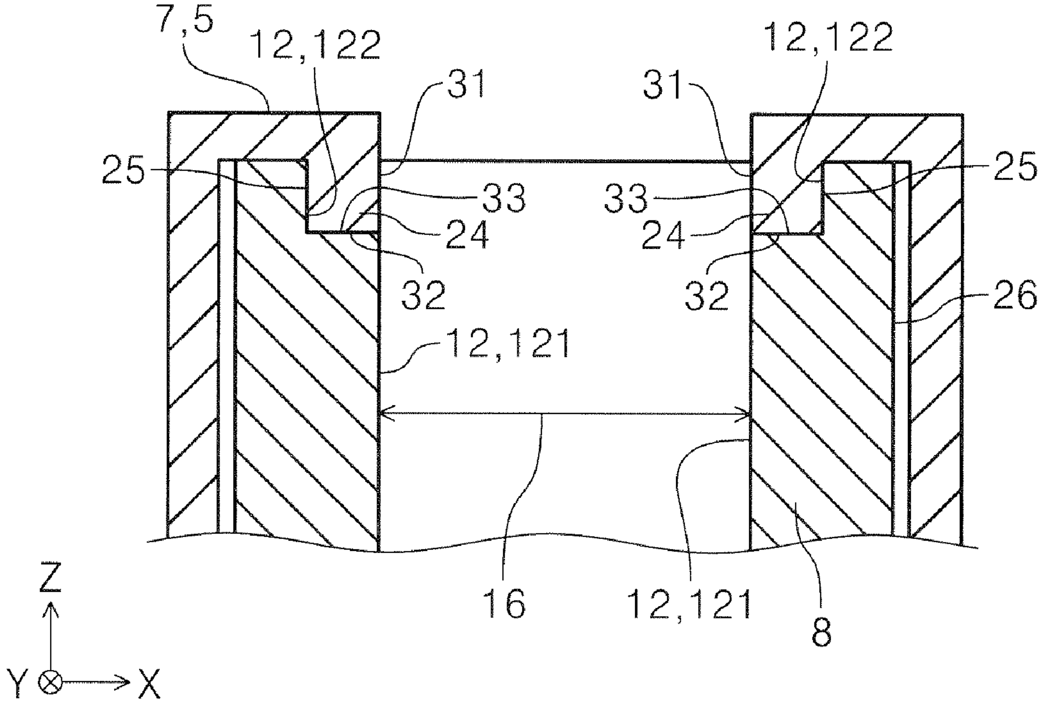

Further, as illustrated in FIG. 9B, in the present embodiment, a surface 31 on the opposite side of the positioning surface 25 of the protruding part 24 is configured to be substantially flush with the first inner surface 121 of the coil 8.

Further, a distal end surface 32 of the protruding part 24 is in contact with a step surface 33 of the stepped coil 80.

As described above, in the present embodiment, the coil 8 is the stepped coil 80, and the positioning is performed by the second inner surface 122 of the stepped coil 80 being in contact with the positioning surface 25. As a result, as illustrated in FIG. 9B, the surface 31 on the opposite side of the positioning surface 25 of the protruding part 24, in other words, the position of a surface facing a magnet 10, can be separated from the magnet 10. Therefore, a magnetic gap 17 can be made smaller than that of a case where the stepped coil 80 is not used. Consequently, it is possible to increase and further stabilize the thrust force for driving the movable body 2 of the swinging unit 1.

As illustrated in FIG. 9B, in reducing the magnetic gap 17, the surface 31 on the opposite side of the positioning surface 25 of the protruding part 24 be configured to be substantially flush with the first inner surface 121 of the coil 8.

Other Embodiments

The swinging unit 1 according to at least an embodiment of the present invention basically has the configuration of the embodiments described above. However, it is of course possible to partially make changes and omissions in the configuration without departing from the gist of the claimed invention.

In the above embodiments, a case where the coil 8 is fixed to the support body 5 and the magnet 10 is fixed to the movable body 2 has been described. However, alternatively, a configuration in which the coil 8 is fixed to the movable body 2 and the magnet 10 is fixed to the support body 5 may be adopted.

What is claimed is:

1. A swinging unit comprising:

a movable body;

a support body which supports the movable body via a fulcrum portion in such a state that the movable body is swingably displaceable; and a swing drive portion which swings the movable body, wherein:

the swing drive portion is constituted by a pair of a coil, which is fixed to a coil fixed portion at one of the movable body and the support body, and a magnet, which is fixed to a magnet fixed portion at the other one of the movable body and the support body; and the coil fixed portion comprises a positioning portion which performs positioning of the coil relative to the coil fixed portion by being in contact with an inner surface of the coil.

2. The swinging unit according to claim 1, wherein:

the coil is mounted on a substrate;

the substrate is attached to one opening portion of the support body, so that the coil is positioned relative to the coil fixed portion of the support body by the positioning portion;

the magnet is fixed to the movable body; and the movable body is attached to the other opening portion of the support body, so that the magnet enters an area formed by inner surfaces of the coil and is fixed in such a state that a predetermined gap is provided between the magnet and the inner surfaces.

3. The swinging unit according to claim 2, wherein:

the movable body is supported on the support body to be swingable about a first axis;

the movable body comprises an optical module;

the optical module is supported on the movable body to be swingable about a second axis intersecting the first axis; and the swing drive portion is constituted of a first swing drive portion, which causes the movable body to be swung about the first axis, and a second swing drive portion, which causes the optical module to be swung about the second axis.

4. The swinging unit according to claim 3, wherein:

the first swing drive portion is constituted by a pair of a first coil and a first magnet;

the second swing drive portion is constituted by a pair of a second coil and a second magnet; and the substrate is provided with a displacement allowing portion, which allows the first coil and the second coil in a state of being mounted to be displaced in directions of coming close to and separating from each other, between a first part on which the first coil is mounted and a second part on which the second coil is mounted.

5. The swinging unit according to claim 4, wherein:

the positioning portion is a protruding part provided on the support body; and the protruding part includes a positioning surface which comes into contact with the inner surface of the coil.

6. The swinging unit according to claim 3, wherein:

the positioning portion is a protruding part provided on the support body; and the protruding part includes a positioning surface which comes into contact with the inner surface of the coil.

7. The swinging unit according to claim 2, wherein:

the positioning portion is a protruding part provided on the support body; and the protruding part includes a positioning surface which comes into contact with the inner surface of the coil.

8. The swinging unit according to claim 1, wherein:

the positioning portion is a protruding part provided on the support body; and the protruding part includes a positioning surface which comes into contact with the inner surface of the coil.

9. The swinging unit according to claim 8, wherein:

the coil includes four inner surfaces; and the protruding part and the positioning surface are provided to correspond to each of the four inner surfaces.

10. The swinging unit according to claim 8, wherein:

the coil is a stepped coil including a first inner surface and a second inner surface which is located closer to an outer surface of the coil than the first inner surface; and the positioning is performed by the second inner surface being in contact with the positioning surface of the protruding part.

* * * * *